(12) United States Patent
Steck et al.

(10) Patent No.: US 11,623,555 B2
(45) Date of Patent: *Apr. 11, 2023

(54) ROOF HANDLE FOR VEHICLES

(71) Applicant: HERO GmbH, Ittlingen (DE)

(72) Inventors: Volker Steck, Waldbrunn (DE); Martin Meister, Sinsheim (DE); Milto Benjamin, Gütersloh (DE)

(73) Assignee: HERO GMBH, Ittlingen (DE)

( * ) Notice: Subject to any disclaimer, the term of this patent is extended or adjusted under 35 U.S.C. 154(b) by 380 days.

This patent is subject to a terminal disclaimer.

(21) Appl. No.: 16/904,481

(22) Filed: Jun. 17, 2020

(65) Prior Publication Data

US 2020/0398724 A1    Dec. 24, 2020

(30) Foreign Application Priority Data

Jun. 18, 2019  (DE) ...................... 10 2019 116 491.5

(51) Int. Cl.
*B60N 3/02*  (2006.01)

(52) U.S. Cl.
CPC ............. *B60N 3/026* (2013.01); *B60N 3/023* (2013.01)

(58) Field of Classification Search
CPC ........... B60N 3/023; B60N 3/026; B60N 3/02
USPC ...................................................... 296/1.02
See application file for complete search history.

(56) References Cited

U.S. PATENT DOCUMENTS

| | | | | |
|---|---|---|---|---|
| 7,585,009 | B2* | 9/2009 | Longwell | B60R 13/025 296/193.06 |
| 7,896,417 | B2* | 3/2011 | Gupta | B60N 3/026 296/214 |
| 8,245,357 | B2* | 8/2012 | Kajio | B60N 3/026 16/444 |
| 8,641,083 | B2* | 2/2014 | Nakamura | B60R 21/21 280/730.2 |
| 10,071,665 | B2* | 9/2018 | Ibrahim | H04R 1/028 |
| 11,052,803 | B2* | 7/2021 | Steck | B60N 3/023 |
| 2020/0122620 | A1* | 4/2020 | Steinigk | B60N 3/023 |

FOREIGN PATENT DOCUMENTS

| | | |
|---|---|---|
| DE | 29604260 U1 | 3/1996 |
| DE | 202013005494 U1 | 10/2014 |

* cited by examiner

*Primary Examiner* — Jason S Morrow
(74) *Attorney, Agent, or Firm* — Boyle Fredrickson, SC

(57) ABSTRACT

A roof handle for vehicles comprises a carrier which can be fixed to a vehicle roof and on which a handle body is pivotably mounted, and is pivotable between a holding position, in which a user exerts a substantially downwardly directed weight force on the handle body, and a starting position, in which the handle body is pivoted by a spring into a folded-up position with respect to the vehicle roof, the carrier comprising a molded body made of plastic on which at least one insert made of metal is provided, and the handle body being held on the insert made of metal via bearing elements. As a result, the roof handle can have a low dead weight and be optimally adapted to the geometry of a vehicle roof.

20 Claims, 16 Drawing Sheets

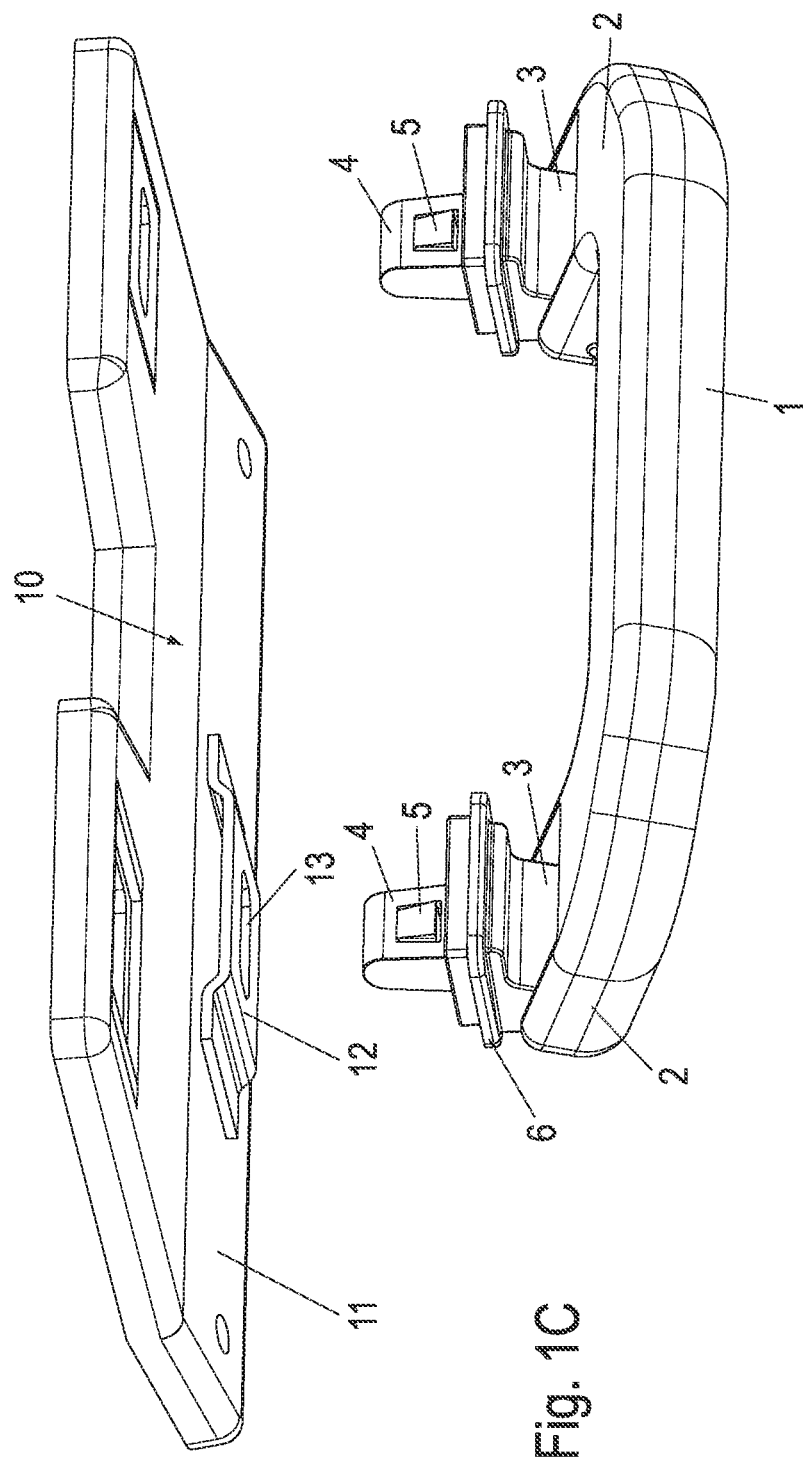

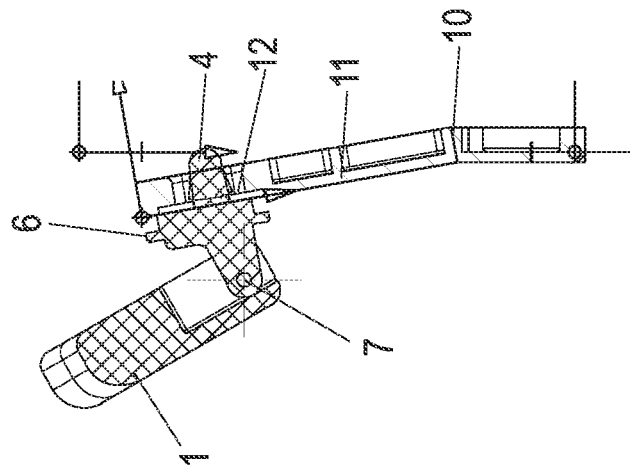
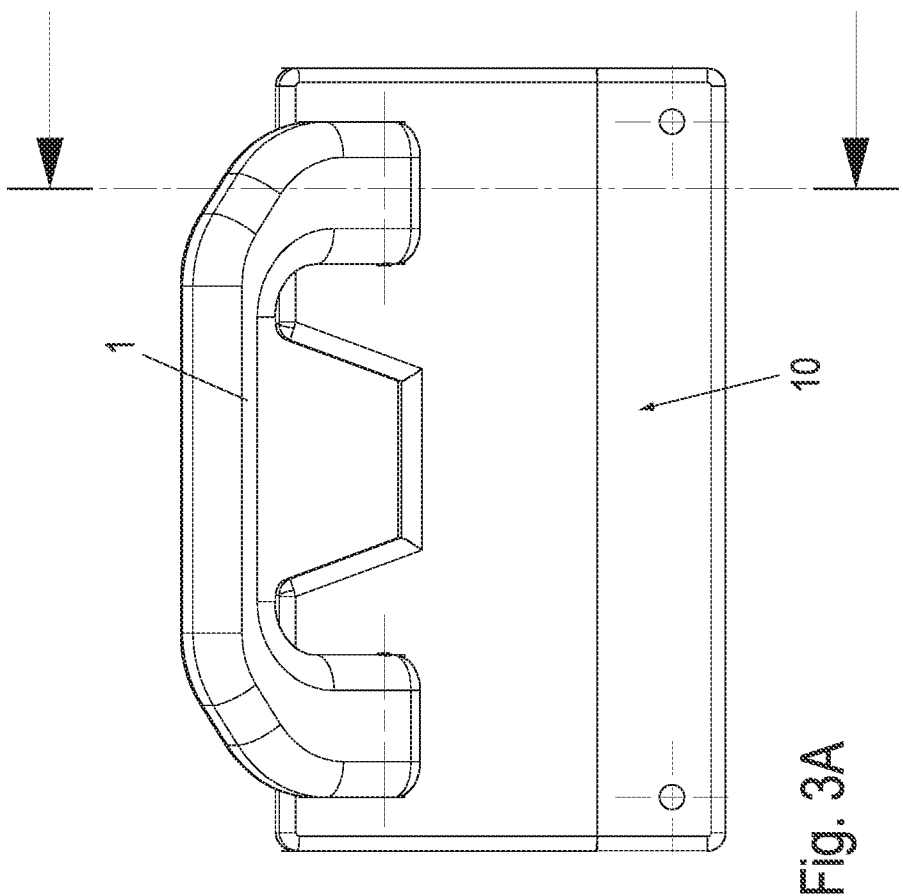

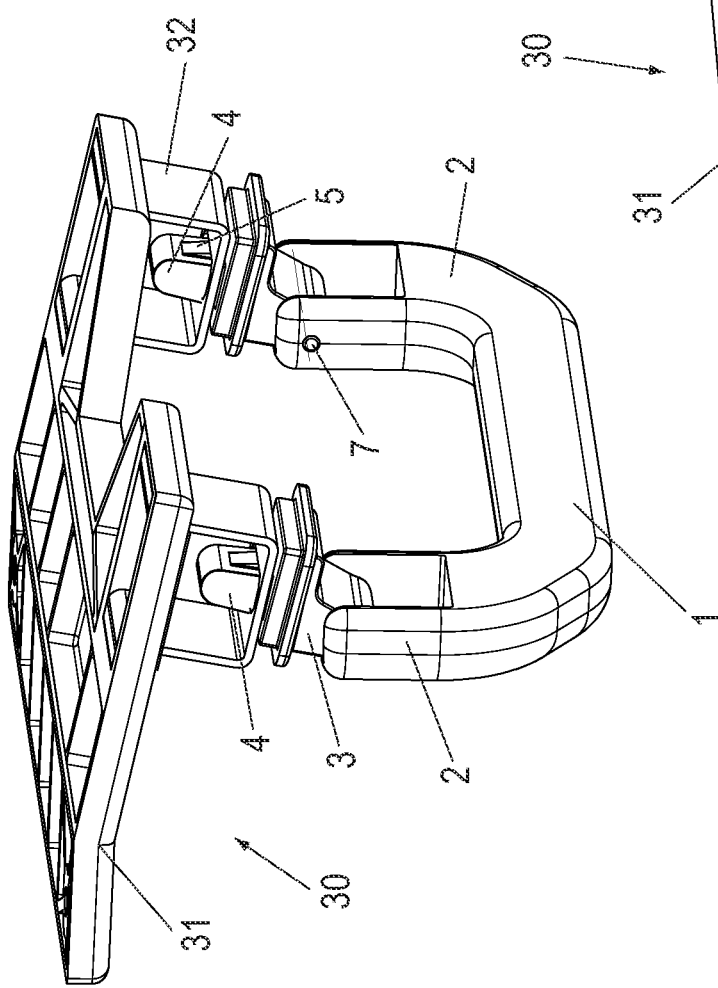
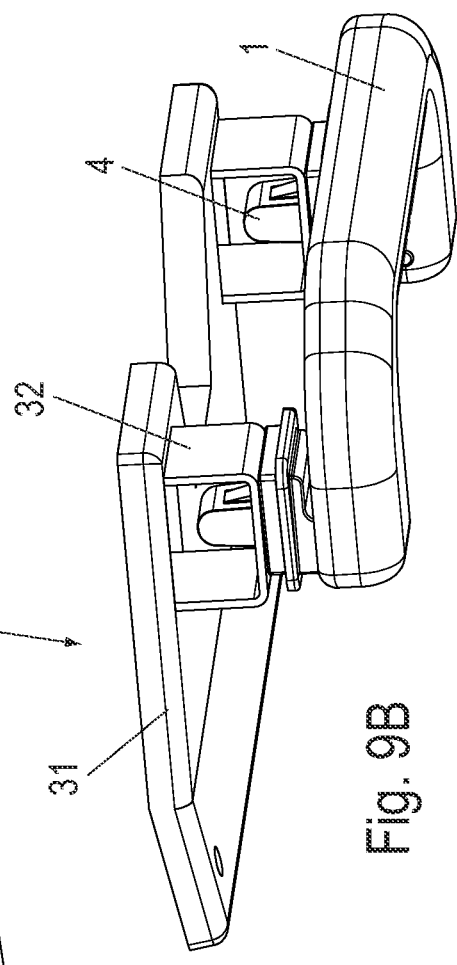

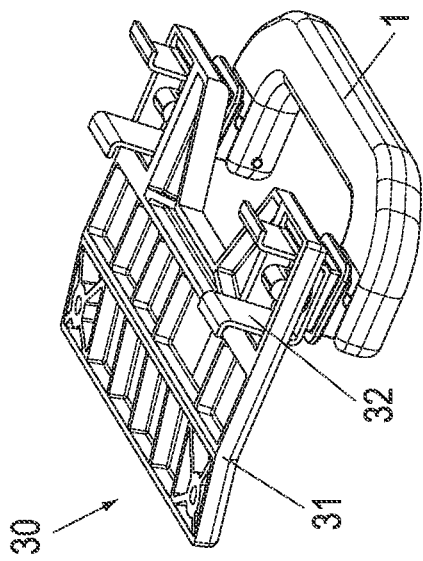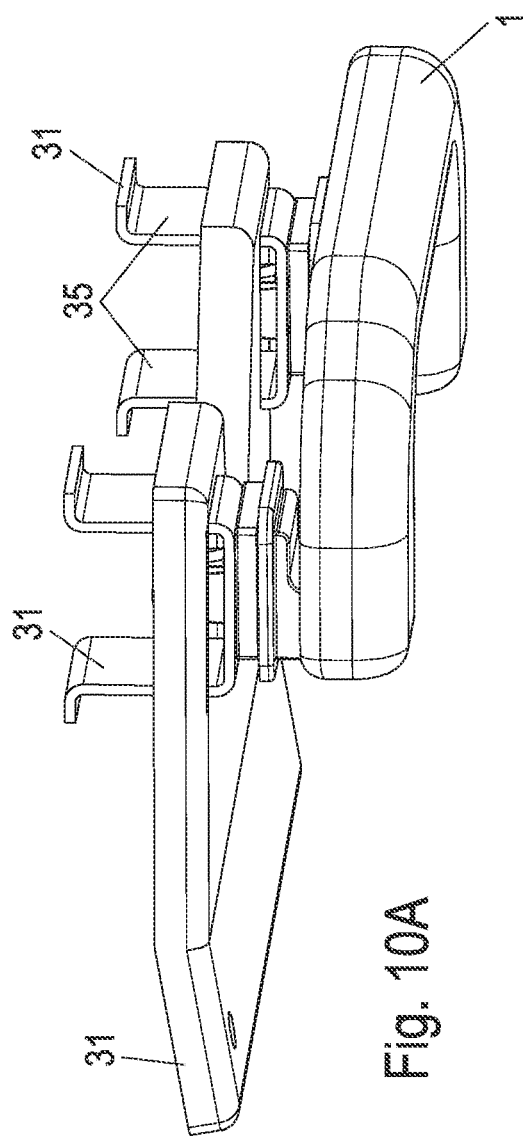

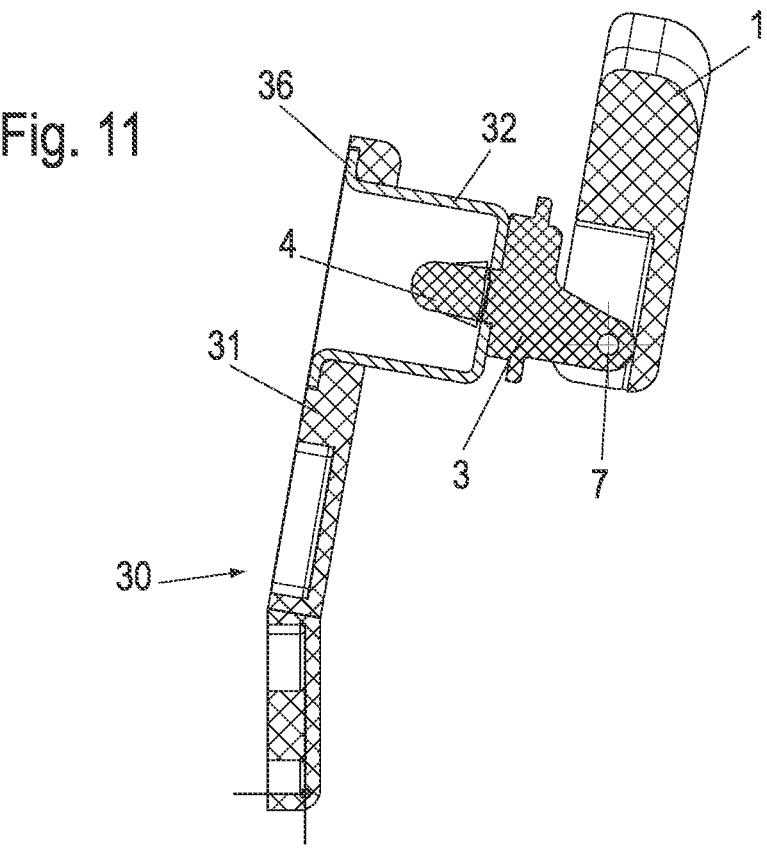
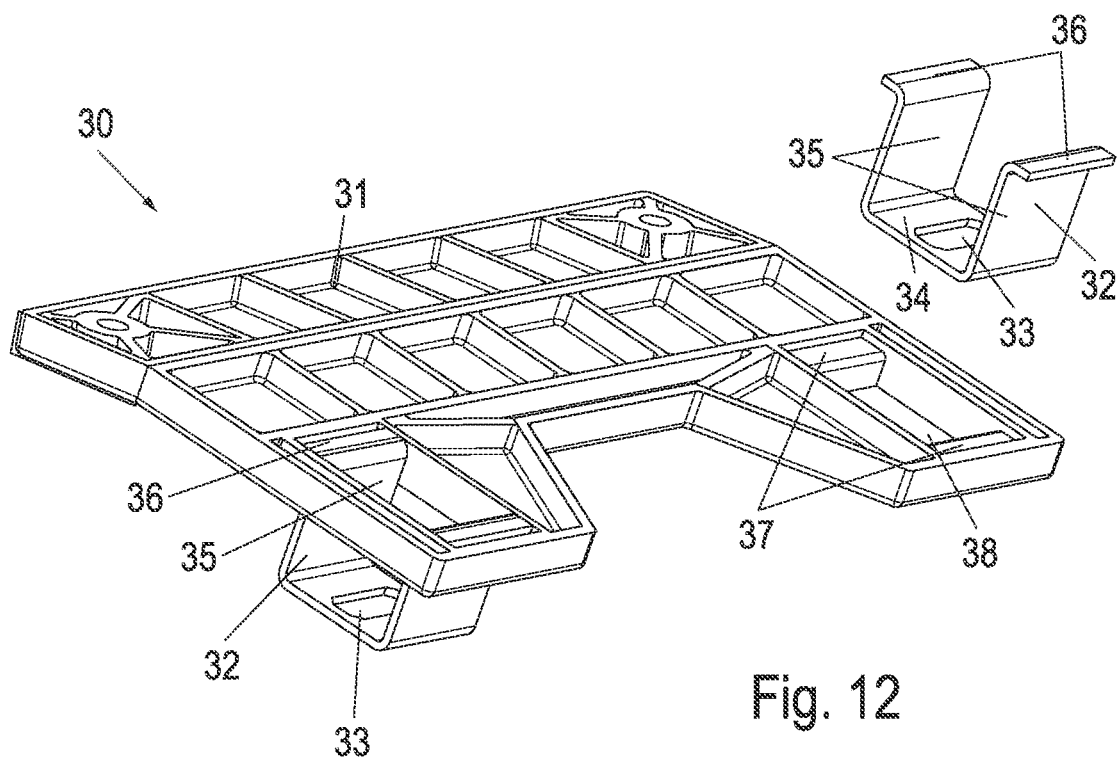

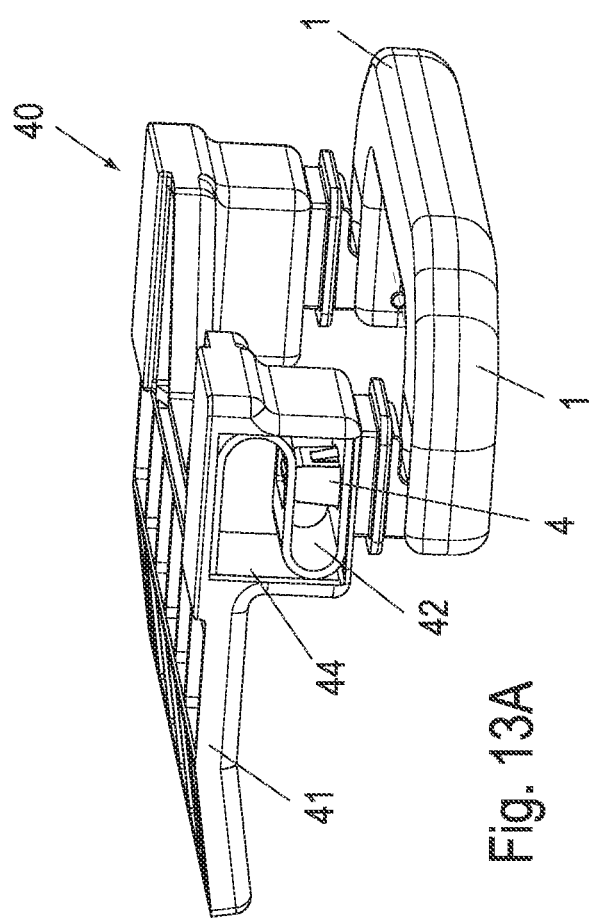
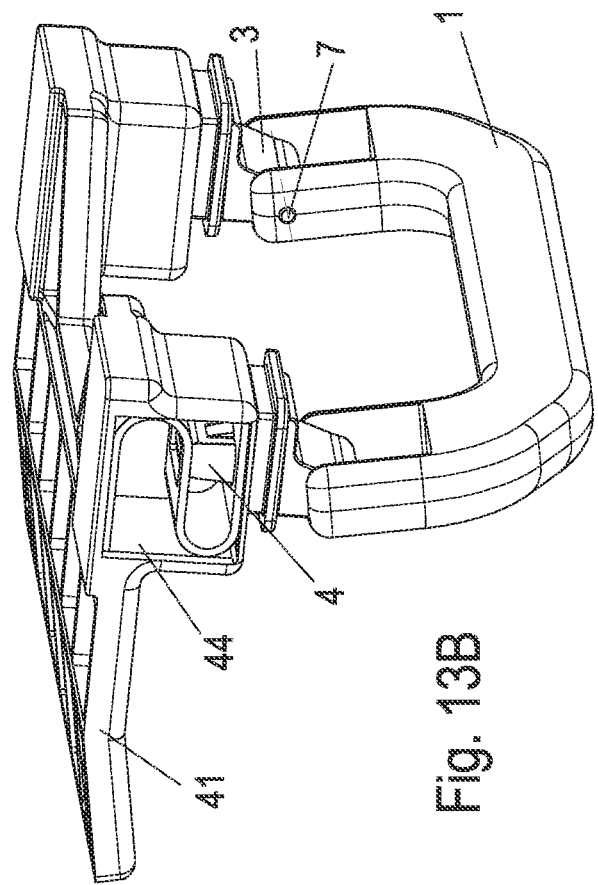

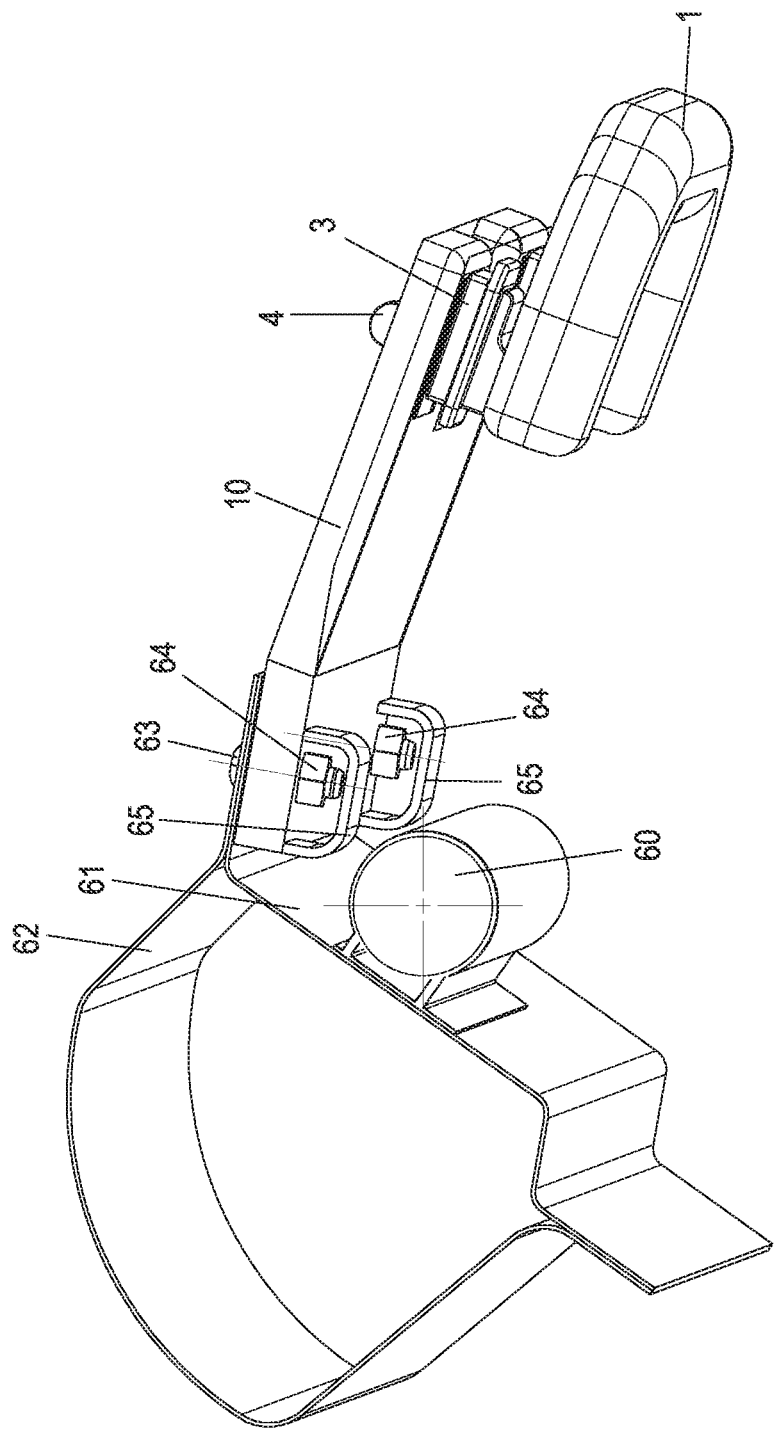

ROOF HANDLE FOR VEHICLES

CROSS-REFERENCE TO RELATED APPLICATIONS

This application claims priority to German Application DE 10 2019 116 491.5, filed Jun. 18, 2019, the entire contents of which is incorporated herein by reference.

BACKGROUND OF THE INVENTION

Field of the Invention

The present invention relates to a roof handle for vehicles with a carrier which can be fixed to a vehicle roof and on which a handle body is pivotably mounted, and can be moved between a holding position in which a user exerts a weight force directed substantially downwards on the handle body, and an initial position in which the handle body is pivoted into a folded-up position relative to the vehicle roof by a handle.

Description of the Related Art

DE 296 04 260 U1 reveals a roof handle which has a bow-shaped handle body which is pivotally mounted via two bearing blocks. The handle bow can thus be grasped by the user and loaded downwards by its weight. After use, the handle bar can be swivelled towards the roof by the force of a spring and thus does not protrude into the vehicle interior. Fastening the two bearing brackets by means of screws and other fasteners is comparatively complex, and the entire unit for fixing the roof handle is also very heavy, which is detrimental to the centre of gravity of a vehicle.

In order to simplify the attachment of such a roof handle, DE 20 2013 005 494 U1 discloses a plate-shaped retaining element for a roof handle, which forms a carrier and can be locked to a roof structure by means of fasteners. This simplifies installation, but the problem remains that the retaining element is made of a steel plate and is relatively heavy.

It is therefore the object of the present invention to create a roof handle for a vehicle which is easy to assemble and has a low intrinsic weight.

BRIEF DESCRIPTION OF THE INVENTION

This task is solved with a roof handle with the features of claim 1.

The roof handle according to the invention comprises a carrier with a molded body of plastic on which at least one metal insert is provided, the handle body being held on the at least one metal insert by a bearing element. The carrier can thus have a low empty weight, since only the highly stressed area of the carrier is made of the metal inserts which serve to fix the bearing elements. The remaining area of the carrier, which is less stressed and has to adapt to the vehicle roof in terms of its contour, is produced by a molded body made of plastic, which is lighter than a comparable metal sheet. The design of the carrier allows weight to be saved, which has a positive effect on the height of the vehicle's centre of gravity.

Preferably, the carrier has two metal inserts spaced apart from each other, which are provided on the plastic molding. This allows the size of the insert to be reduced to a minimum, since only the area around the bearing elements is reinforced by the two metal inserts. The remaining area of the support can be made of plastic.

For a stable fixing of the bearing elements of the handle body, the inserts can each have an opening, in particular a rectangular opening into which a fixing element for a bearing element is inserted. The fastening element can be locked in place at the opening of the insert, for example by means of one or more flexible locking bars.

The at least one metal insert can be injection molded in the molded body of plastic. Alternatively, the at least one insert can also be non-positively fixed in the molded body at a receptacle.

The molded body of plastic is preferably essentially plate-shaped and has a stiffening structure formed by webs. This stiffening structure can be framework-like or lattice-like in order to have a low intrinsic weight via the hollow chambers formed as a result. The molded body does not have to be flat, but can also be curved or angled to adapt optimally to the geometry of the vehicle roof.

Preferably, the volume of at least one metal insert is less than 40%, preferably less than 20% of the total volume of the carrier. The total volume of the carrier consists of the molded body of plastic including the cavities in the molded body and the at least one metal insert. The total volume can thus be determined by the outer contour of the carrier. The at least one metal insert, for example, can take up a volume of between 2% and 10% of the total volume of the carrier.

In a further design, the roof handle includes an impact protection by means of which the handle body can be moved towards the carrier in the event of an impact on the handle body. This can prevent injuries, especially when a vehicle occupant hits the handle body.

Preferably, the impact protection is designed in such a way that the handle body remains dimensionally stable on the carrier in the event of a triggering force for the impact protection which is caused downwards by a weight force, but in the event of the triggering force or if the triggering force is exceeded, the impact protection allows the handle body to move upwards when the triggering force acts on the handle body. The release force can, for example, correspond to a weight force between 20 kg (44.1 lbs.) and 120 kg (264.6 lbs). In other words, when a user loads downwards, the handle body does not move relative to the carrier, but when the same trigger force is applied upwards towards the carrier, the handle body moves relative to the carrier, in particular it moves or pivots. This increases the safety of the vehicle occupants.

In a further design, the handle body is bow-shaped, whereby the handle body is preferably made of plastic. The metal inserts, on the other hand, are made of a bent and punched metal sheet, especially a steel sheet. The at least one insert can be made of a metal sheet with a thickness between 0.5 mm (about 1/64 in.) and 3 mm (about 1/8 in.), preferably between 1 mm (about 3/64 in.) and 2 mm (about 5/64 in.), so that on the one hand sufficiently high forces can be absorbed and on the other hand the weight of the at least one metal insert is kept low.

In a further configuration, the carrier is provided with a shield which forms a cover for an adjacent airbag in the event of deployment. The shielding can, for example, cover fasteners on the carrier, such as a bolt or nut, where the airbag could be damaged during deployment. Preferably, the shielding is formed integrally with the plastic molding.

BRIEF DESCRIPTION OF THE DRAWINGS

The invention is explained in more detail below by means of several embodiments with reference to the attached drawings, which show:

FIGS. 1A to 1C illustrate several views of a first example of a roof handle according to the invention;

FIGS. 3A and 3B illustrate two views of the roof handle of FIG. 1, partially in section;

FIGS. 9A and 9B illustrate two views of a third example of a roof handle in accordance with the invention, FIGS. 10A and 10B illustrate two views of the roof handle of FIG. 9 after an impact;

FIG. 11 is a sectional view of the roof handle of FIG. 9B;

FIG. 12 is an exploded perspective view of the roof handle carrier of FIG. 9;

FIGS. 13A and 13B illustrate two views of a fourth embodiment of a roof handle of the invention;

FIG. 18 is a schematic view of a roof handle in the mounted position with a shield.

DETAILED DESCRIPTION OF THE INVENTION

Figure 1B:
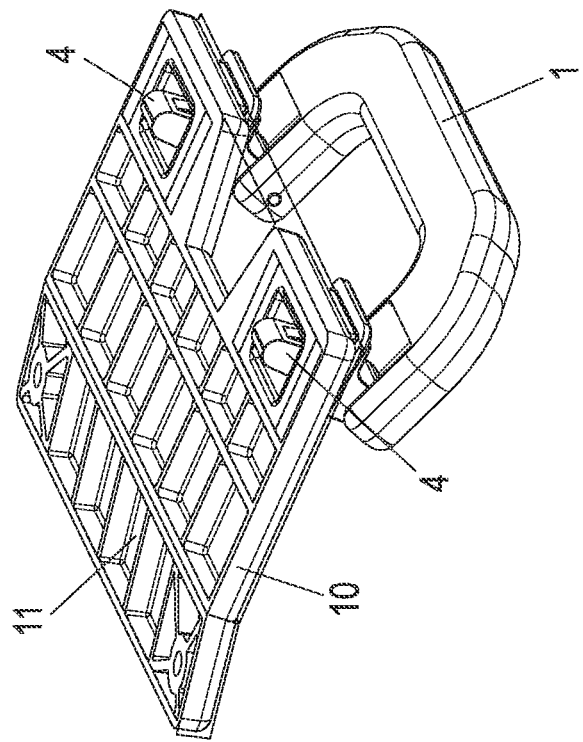
Figure 1A:
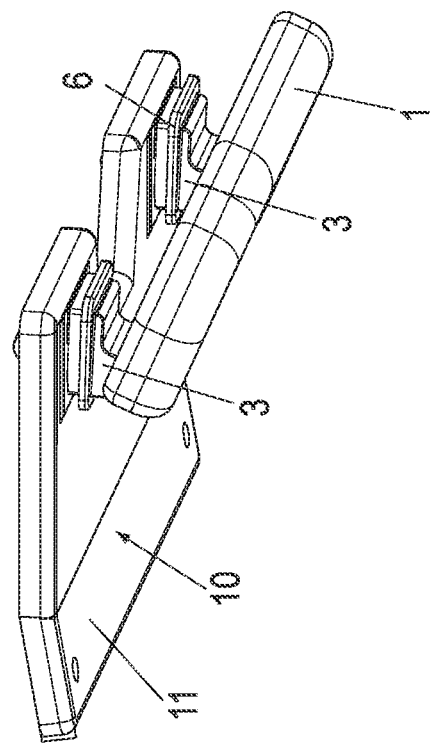

A roof handle comprises a handle body 1, which has a bow-shaped design and is pivotally mounted at two curved end sections 2 each on a bearing element 3. Each bearing element 3 comprises a fastening element 4, on which one or more bendable latching webs 5 are provided to lock the handle body 1 to a carrier 10. In addition, each bearing element 3 is provided with a frame 6 which can be mounted on a vehicle roof, in particular can be inserted into a receptacle on the vehicle roof.

The carrier 10 comprises a substantially plate-shaped molded body 11 made of plastic on which two receptacles are formed at which the fastening elements 4 are inserted. As can be seen in FIG. 1C, the fastening elements 4 are not inserted into the plastic molded body 11, but an insert 12 made of metal, which has an opening 13, in particular a substantially rectangular opening 13, into which the fastening element 4 is inserted, the latching webs 5 locking behind the insert 12 and thus preventing the fastening elements 4 from being pulled out after assembly.

Figure 2B:
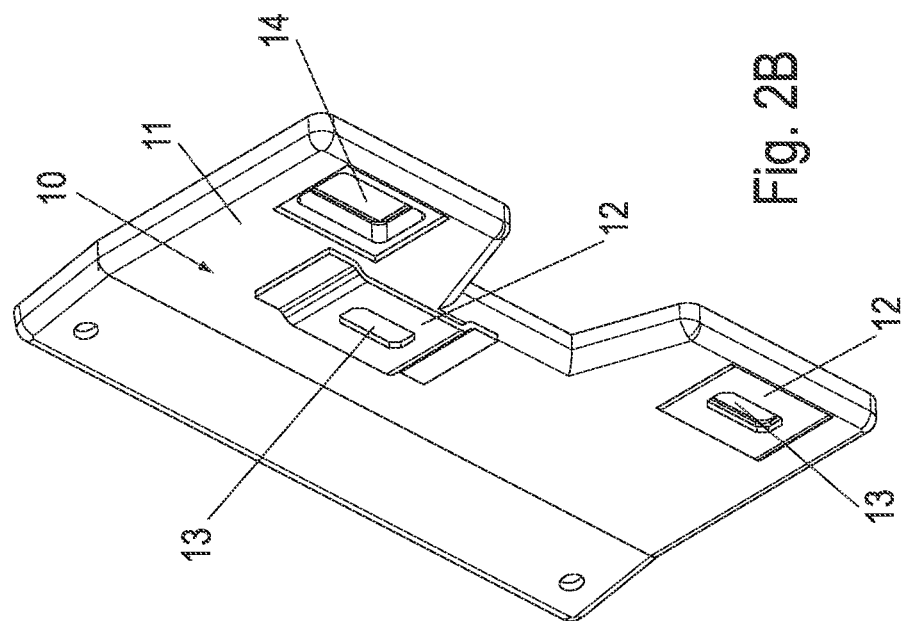
FIGS. 2A and 2B illustrate two views of the carrier of the roof handle of FIG. 1.
Figure 2A:
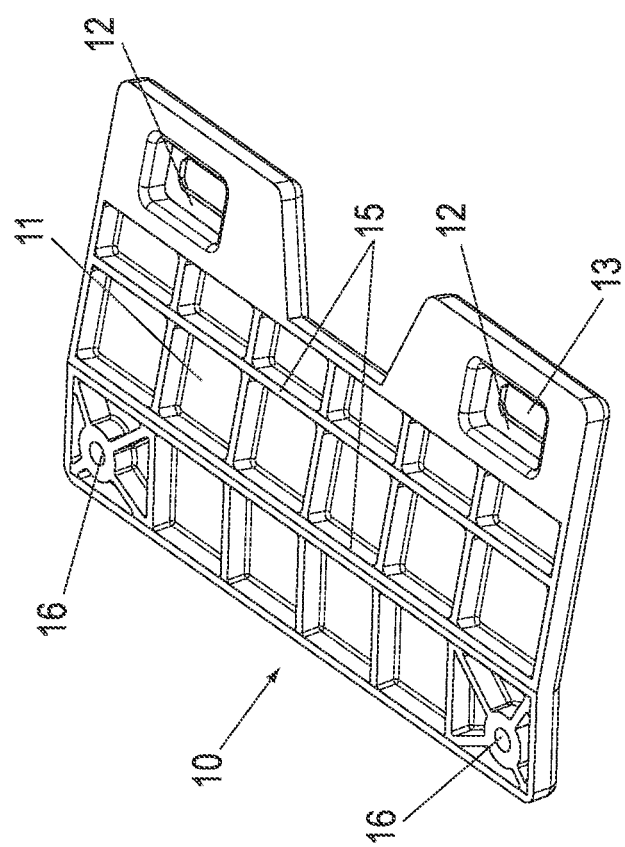

FIGS. 2A and 2B show the molded body 11, which has a stiffening structure formed by webs 15. The webs 15 can be lattice, truss or other geometry to make the molded body 11 stable but with a low dead weight. In addition, two openings 16 for fasteners are provided in the molded body 11 to fix the molded body 11 to a vehicle roof.

The metal inserts 12 are stepped on opposite end faces, the stepped area being at least partially injection molded into the molded body 11. For this purpose, receptacles with openings 14 are provided in the molded body 11, so that a fastening element 4 can be inserted both through the opening 13 on the insert 12 and through the opening 14 of the molded body 11.

FIGS. 3A and 3B show the mounted position of the handle body 1 on the carrier 10. The slightly angled molded body 11 is penetrated by the fastening element 4, which is fixed to the metal insert 12. This means that only the highly stressed area is made of metal, while the lighter molded body 11 is used for the remaining area.

In order to form an impact protection which enables the handle body 1 to be moved towards the carrier 10 in the event of a release force with an upward direction of action, the webs 15 of the molded body can be designed accordingly and can optionally bend or separate via predetermined breaking points to enable the handle body 1 to move relative to the molded body 11 in the event of an impact. If the handle body 1 is loaded by a force of the same magnitude, i.e. a "release force", which acts downwards by pulling on the handle body 1 in the mounted position of the handle body 1, the handle body 1, on the other hand, remains stable on the carrier 10.

The following figures show further embodiments of a roof handle, whereby the handle body 1 and the bearing elements 3 are designed as in the first embodiment. Therefore, the same reference signs are used. Only the carriers are each designed with different impact protection.

Figure 4B:
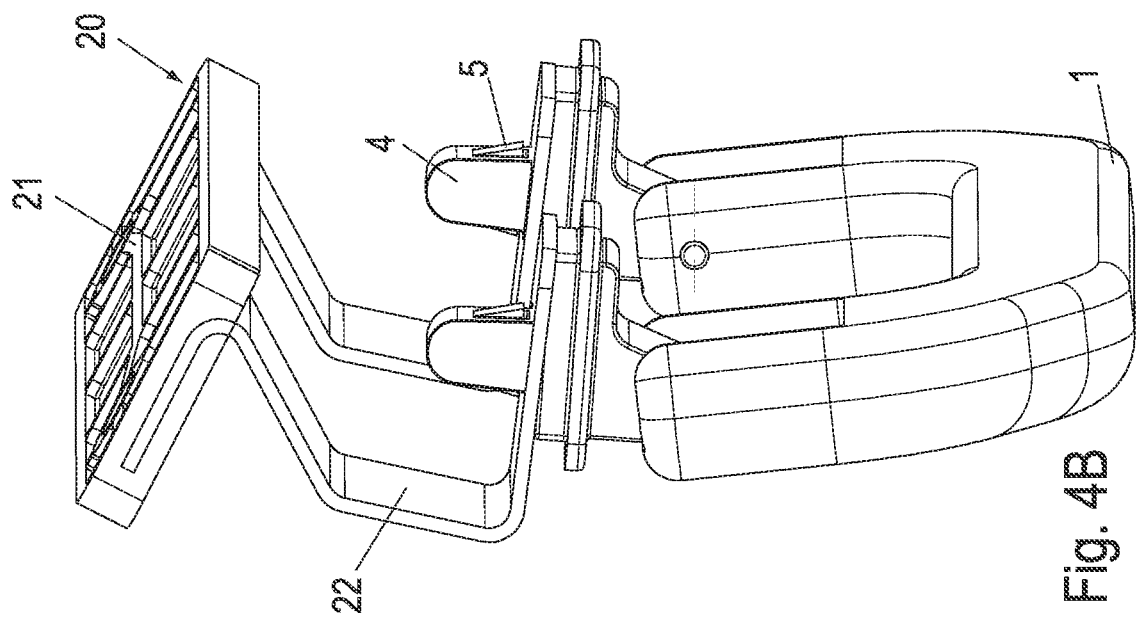
FIGS. 4A and 4B illustrate two views of a roof handle as shown in a second example.
Figure 4A:
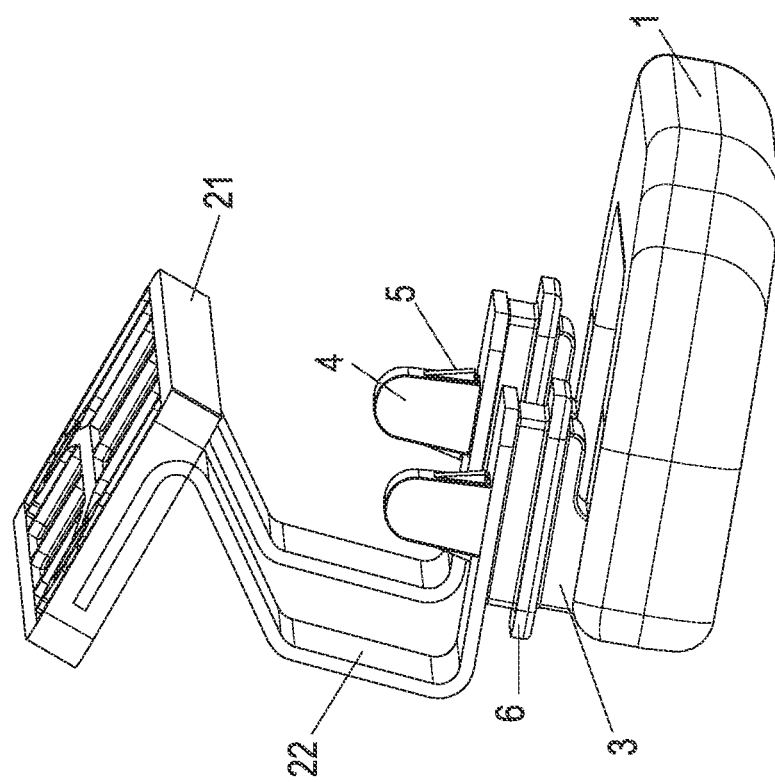

FIGS. 4A and 4B show a carrier 20 which has a molded body 21 made of plastic to which two metal inserts 22 are fixed, preferably by injection molding. The metal insert 22 is not embedded in the molded body 21 but protrudes from it. The fastening elements 4 are inserted into a section of the insert 22, which is arranged at a distance from the plastic molded body 21. The fastening elements 4 are locked into place at one opening each of an insert 22. FIG. 4A shows the starting position in which the handle body 1 is swung upwards towards a vehicle roof. FIG. 4B shows the handle body 1 in a holding position in which a user exerts a substantially downward weight force on the handle body 1.

Figure 5:
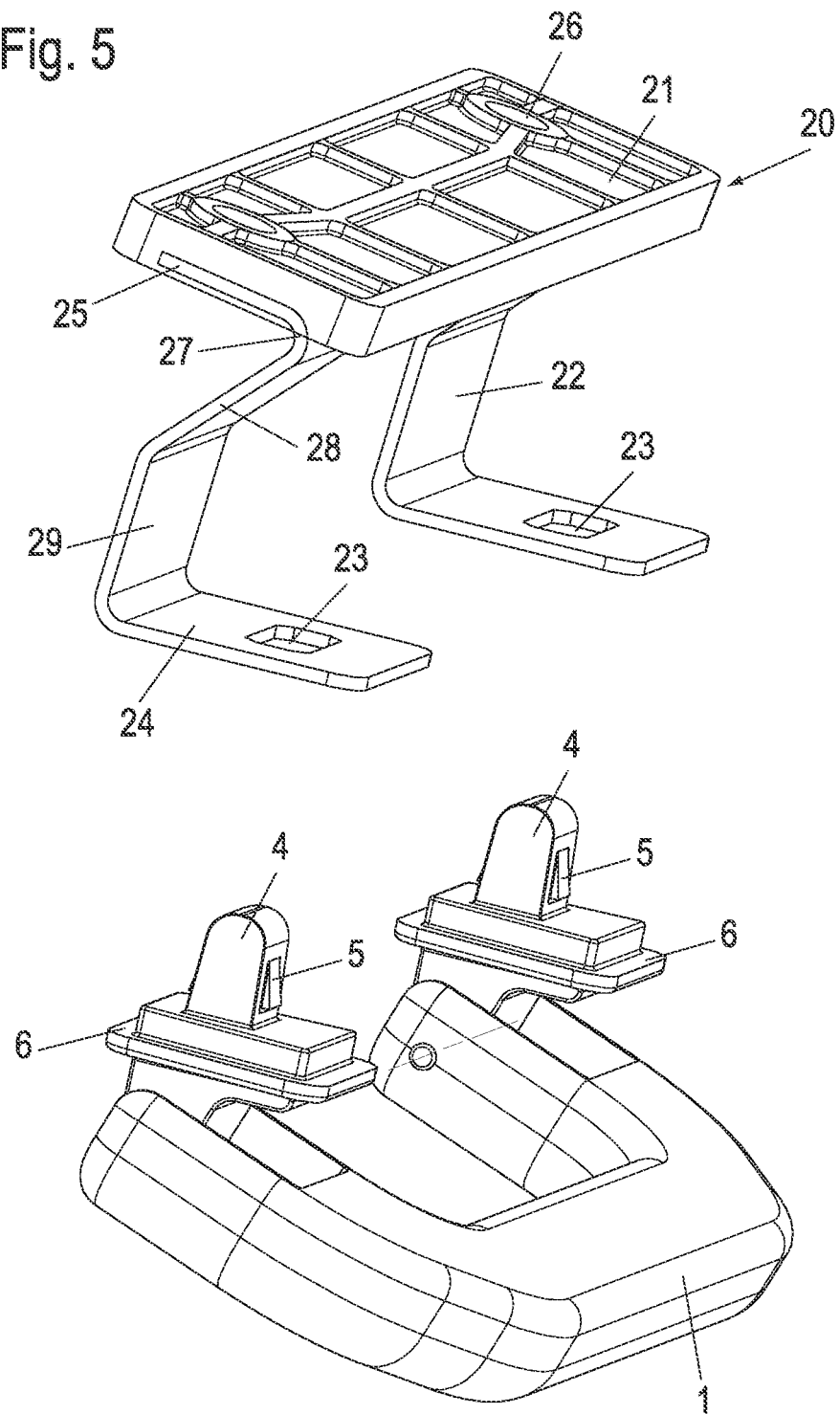
FIG. 5 is a perspective exploded view of the roof handle of FIG. 4.

FIG. 5 shows handle body 1 removed from carrier 20. The carrier 20 comprises a substantially plate-shaped molded body 21, reinforced by a stiffening structure formed by webs. In the molded body 21 there are openings 26 for fasteners to fix the molded body 21 to a vehicle roof.

The two inserts 22 made of a bent metal sheet comprise a retaining web 25 embedded in the molded body 21. An inclined web 28 extends from the retaining web 25, which is connected to the retaining web 25 via a bend 27. The inclined web 28, for example, is inclined at an angle between 50° and 80° to the retaining web 25. An angled web 29 extends from the inclined web 28, which is aligned substantially perpendicular to the retaining web 25 and on which an angled end section 24 is integrally formed, which in each case has an opening 23, in particular a substantially rectangular opening 23, into which a fastening element 4 is inserted. Each insert 22 is thus bent essentially in a Z-shape, whereby other geometries of inserts 22 can also be provided.

Figure 6A:
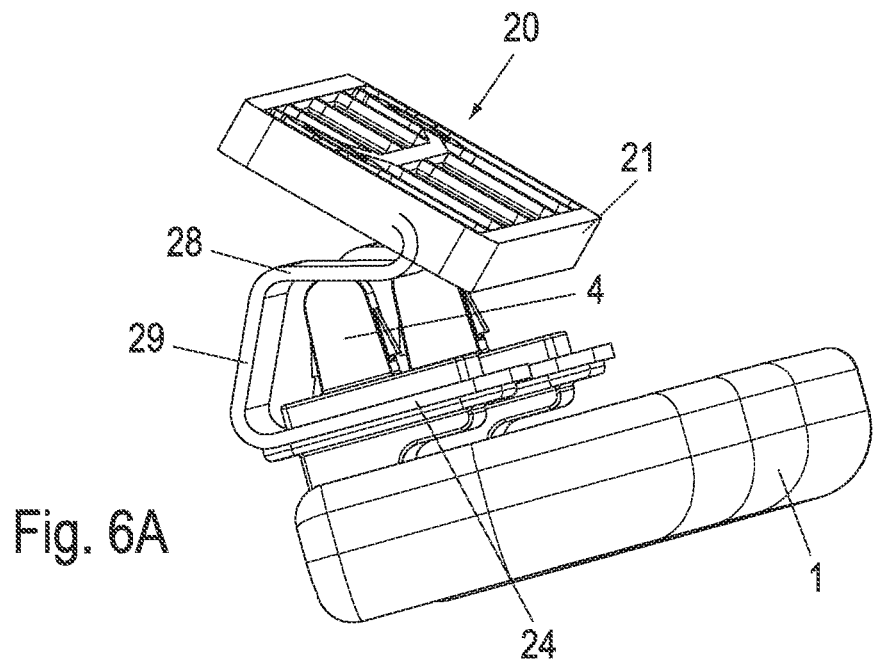
FIGS. 6A and 6B illustrate two views of the roof handle of FIG. 4 after an impact.
Figure 6B:
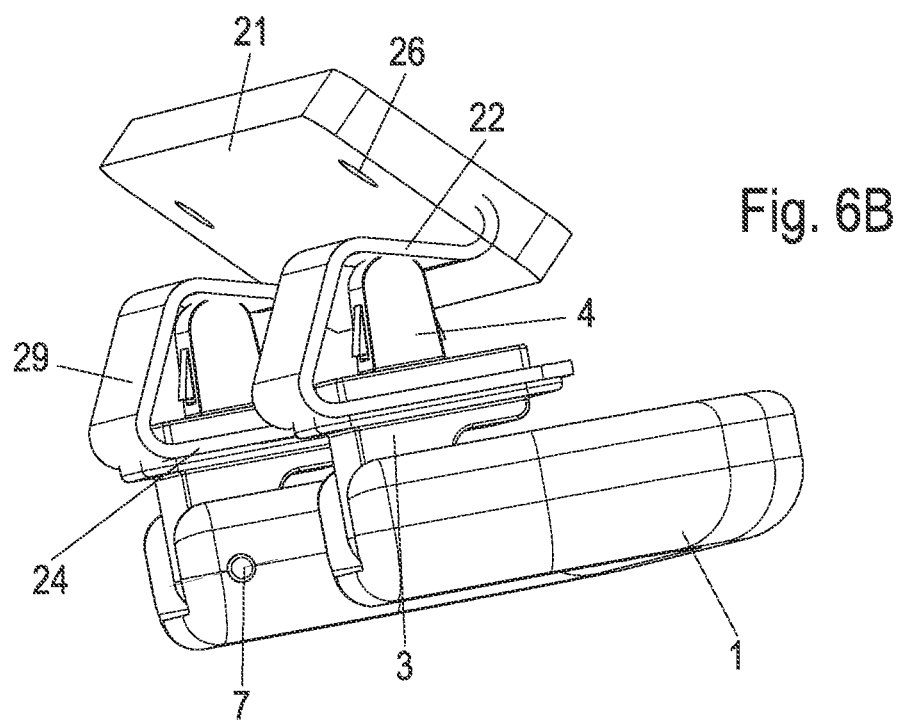

The shape of insert 22 provides effective impact protection, as shown in FIGS. 6A and 6B. If the handle body 1 in the initial position of FIG. 4A is subjected to an upward impact load in the direction of the vehicle roof, the insert 22 is bent when the release force is reached, which can correspond, for example, to a weight force of between 20 kg (44.1 lbs.) and 120 kg (264.6 lbs.). This allows the handle body 1 to be moved in the direction of the vehicle roof in order to absorb impact forces and thus minimise injury from handle body 1. As the comparison of FIGS. 5 and 6 shows, the impact moved the end section 24 in the direction of the molded body 21. Due to the arrangement of the inclined web 28, the web-shaped insert 22 can be deformed at the bend to allow the handle body 1 to move in the direction of molded body 21.

Figure 7:
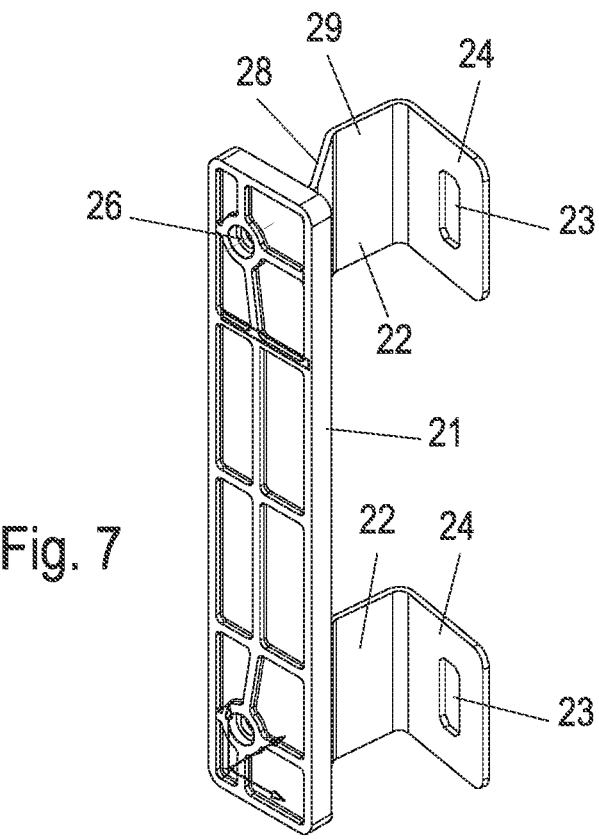
FIG. 7 is a perspective view of the carrier of FIG. 4.

FIG. 7 shows the carrier 20 without the handle body 1. It can be seen that two spaced inserts 22 are provided, which are only connected to each other via the plastic molded body 21. In this embodiment, the molded body 21 has a web-shaped design, where another geometry can also be used.

Figure 8:
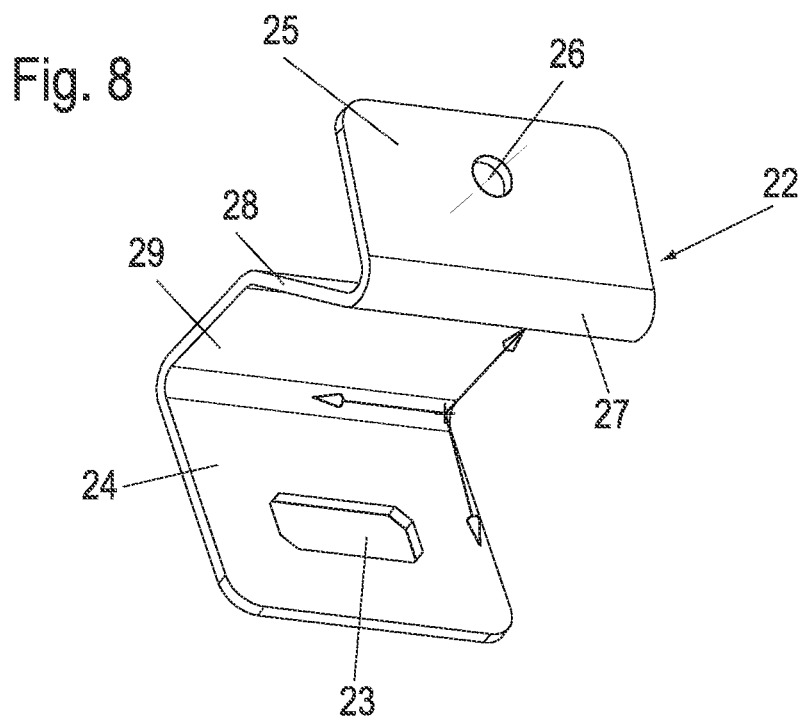
FIG. 8 is a perspective view of the metal insert of the carrier of FIG. 7.

FIG. 8 shows the insert 22, and it can be seen that the retaining web 25 has an opening 26 which is aligned with the opening 26 on the molded body 21, so that fasteners can fix both the molded body 21 and the insert 22 to a vehicle roof.

FIGS. 9 to 12 show a further example of a roof handle, whereby FIG. 9A shows the handle body in a holding position where the user pulls on the handle body 1, while FIG. 9B shows the handle body 1 in a folded up starting position. The handle body 1 is fixed to a carrier 30 via fastening elements 4, the carrier 30 having a molded body 31 made of plastic and two inserts 32 made of a bent metal sheet. In this case, the two inserts 32 are bent into a U-shape and have an opening at a base section through which the fastening elements 4 are inserted.

In order to provide the handle body 1 with impact protection, the inserts 32 are arranged so that they can be moved upwards when a load is applied, i.e. towards the molded body 31, when a release force is exceeded, as shown in the FIGS. 10A and 10B. When the release force is exceeded, e.g. a force corresponding to a weight of 20 kg (44.1 lbs.) to 120 kg (264.6 lbs.), the handle body 1 can be moved towards the molded body 31, whereby the two legs 35 of the insert 32 are displaced relative to the molded body 31. The insert 32 has outwardly angled projections 36 on the two legs 35 which, in the assembled position of FIG. 9, prevent the handle body 1 from moving downwards, but allow the handle body 1 to be moved upwards once a certain release force has been reached.

As can be seen in the sectional view of FIG. 11, the projections 36 are in contact with the molded body 31 in the assembled position, thus preventing handle body 1 from moving downwards at the bearing elements 3. The insert 32 can be force-fitted to the molded body, for example by means of certain clamping forces, which only allow the insert 32 to be moved towards the molded body 31 when a release force is exceeded.

FIG. 12 shows an exploded view of the carrier 30 in part. Molded body 31 made of plastic is essentially plate-shaped and comprises a stiffening structure formed by webs. In addition, openings 38 are formed in two web-shaped sections of the molded body 31, where a stop 37 is provided which interacts with the projections 36 of the insert 32. This allows the inserts 32 to be inserted through the opening 38. Then a bearing element 3 can be fixed to a base 34 of the insert 32 by a fastening element 4. Two legs 35 extend from the base 34 to the molded body 31, on which the projections 36 are supported by the stop 37.

To adjust the release force when the handle body 1 is loaded upwards, i.e. towards the molded body 31, the projections 36 can be glued to the molded body 31. Alternatively, a web with a predetermined breaking point or another component can be provided which releases the insert 32 only when a certain release force is exceeded, so that the insert 32 can then be moved relative to the molded body 31.

FIGS. 13A and 13B show a further example of a roof handle in which the handle body 1 is shown in an initial position as shown in FIG. 13A and in a holding position in which the handle body 1 has been swung downwards as shown in FIG. 13B. A carrier 40 for fixing the handle body 1 comprises a molded body 41 made of plastic on which an insert 42 made of a metal sheet is held. In this example, the insert 42 made of a metal sheet is designed as a bent leaf spring, which is arranged in a receptacle, in particular a chamber 44 of the molded body 41. The insert 42 comprises an opening 43 at one end section for the insertion of a fastening element 4. When the handle body 1 is loaded downwards, the fastening element 4 is held on the plastic molded body 41 via the end section of the insert, and no relative movement takes place between handle body 1 and molded body 41. If, on the other hand, the handle body 1 is loaded by an upward force towards the molded body 41, the insert 42 can deform, as it is made of a flexible metal sheet. Then the insert 42 can be moved within the chamber 44 on the molded body 41 to move the handle body 1 upwards and thereby absorb impact forces.

Figure 14:
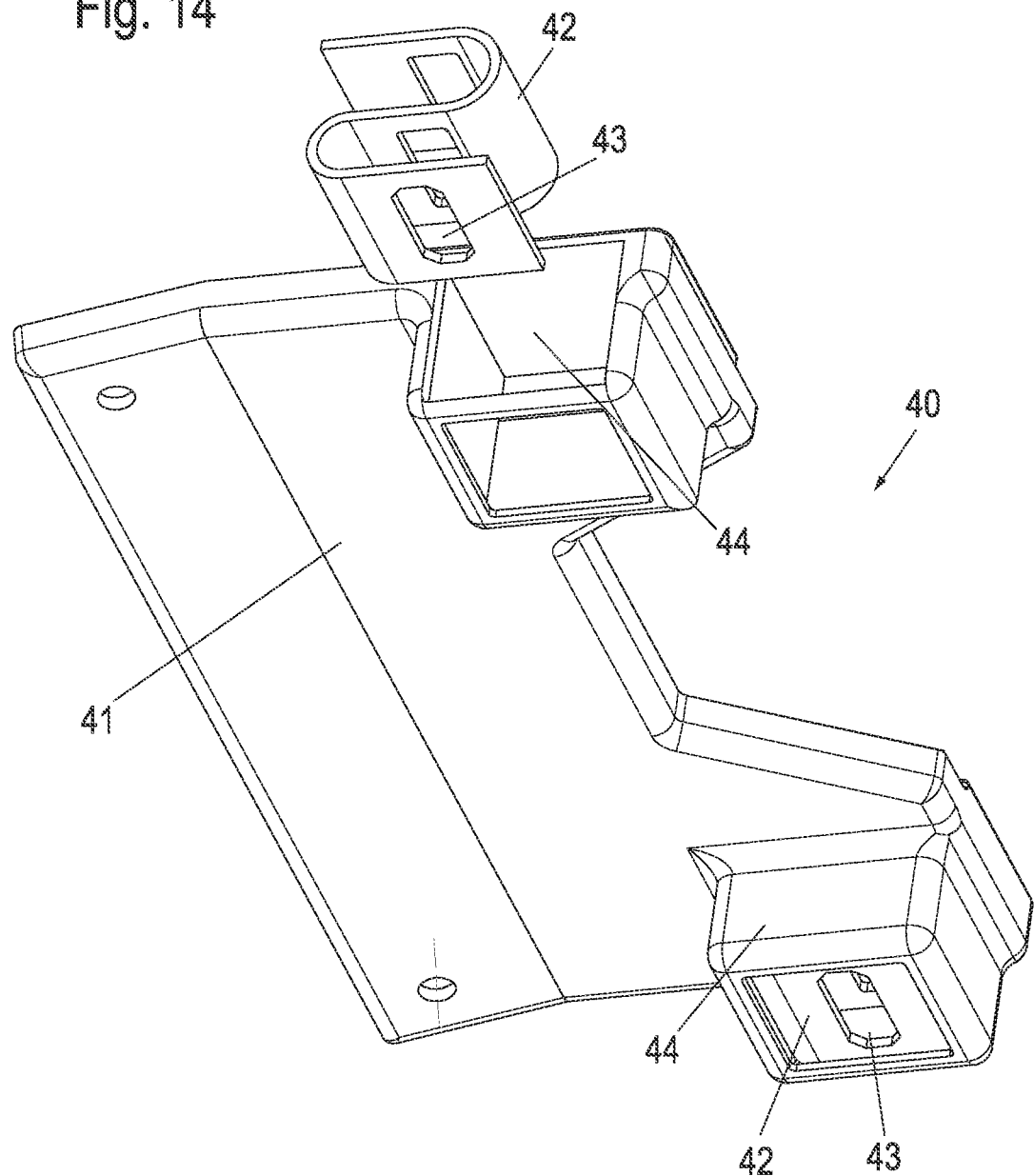
FIG. 14 is a perspective exploded view of the carrier of the roof handle of FIG. 13.

FIG. 14 shows the carrier 40 in detail. Integral with the molded body 41 is a chamber 44 or receptacle into which the S-shaped insert 42 can be inserted laterally. An end section of the insert 42 with the opening 43 is held against stops of the chamber 44 and therefore cannot be pulled out downwards through an opening in the chamber 44. If a load is applied in the opposite direction, the insert 42 can be deformed, whereby several aligned openings are provided on the insert 42, through which the fastening element 4 can then be inserted in the event of an impact.

Figure 15A:
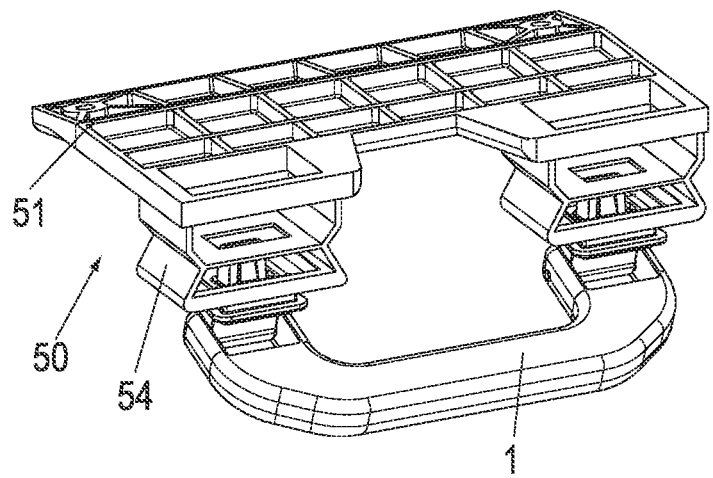
FIGS. 15A to 15C illustrate multiple views of a fifth example of a roof handle of the invention.
Figure 15B:
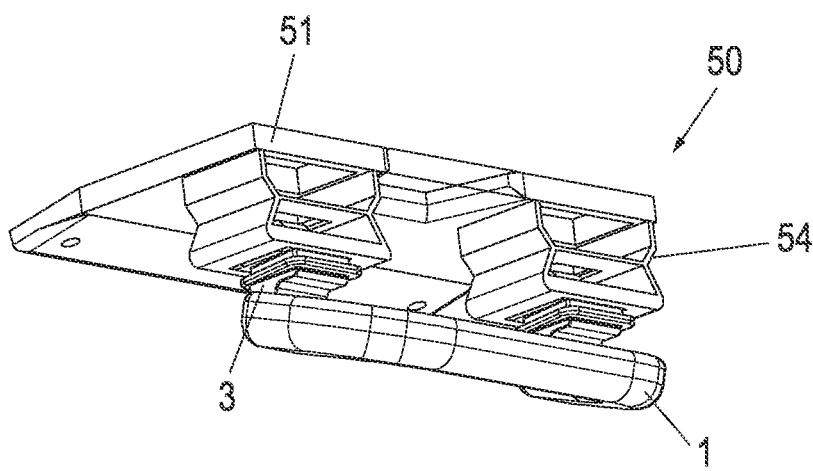
Figure 15C:
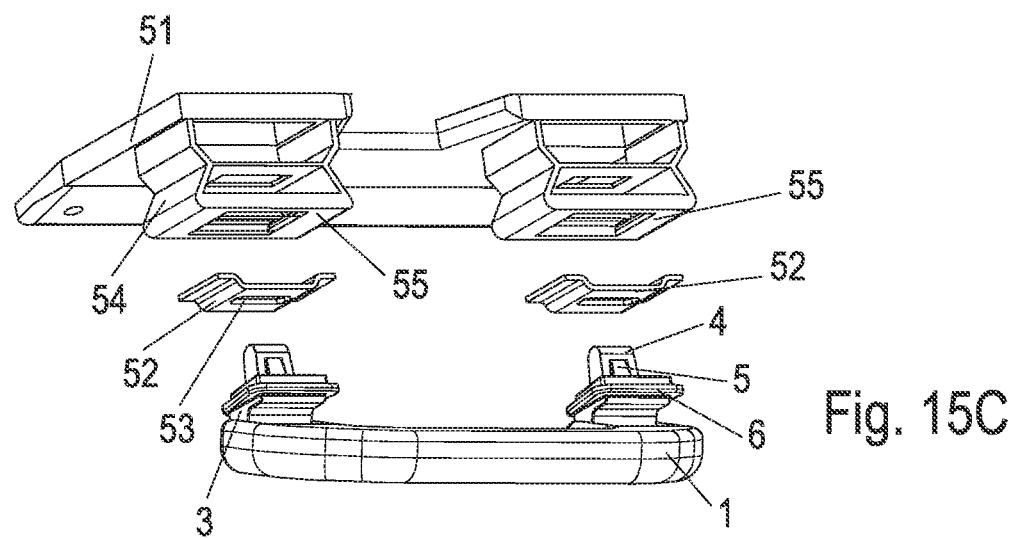
Figure 16:
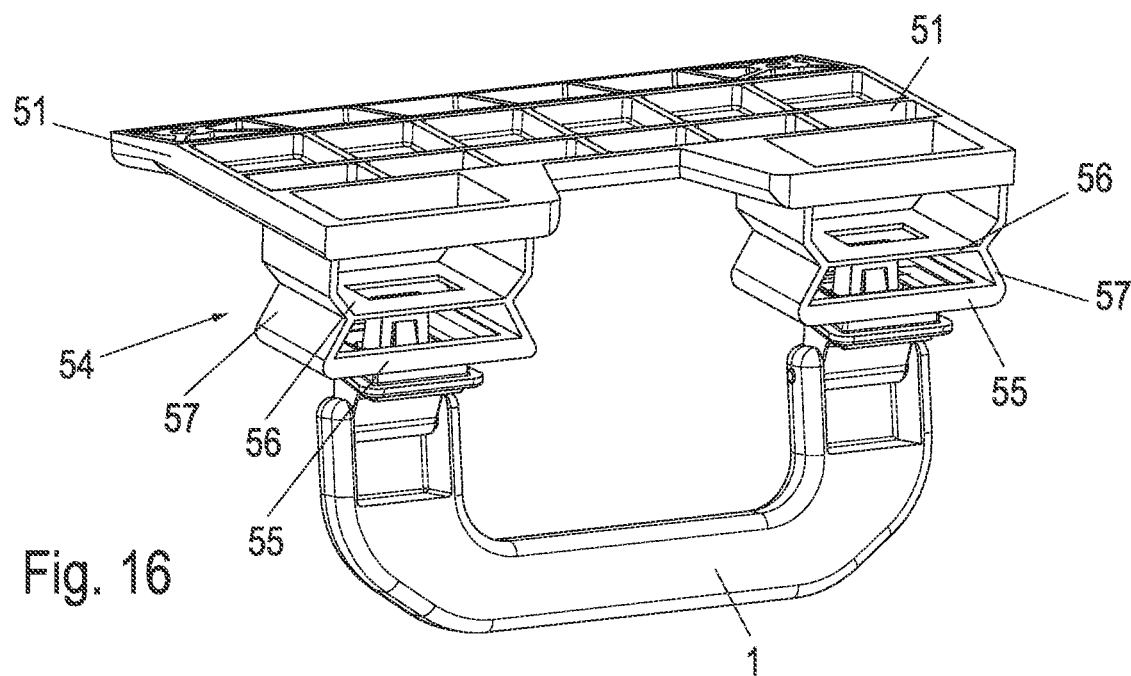
FIG. 16 is a view of the roof handle of FIG. 15 in a holding position.
Figure 17:
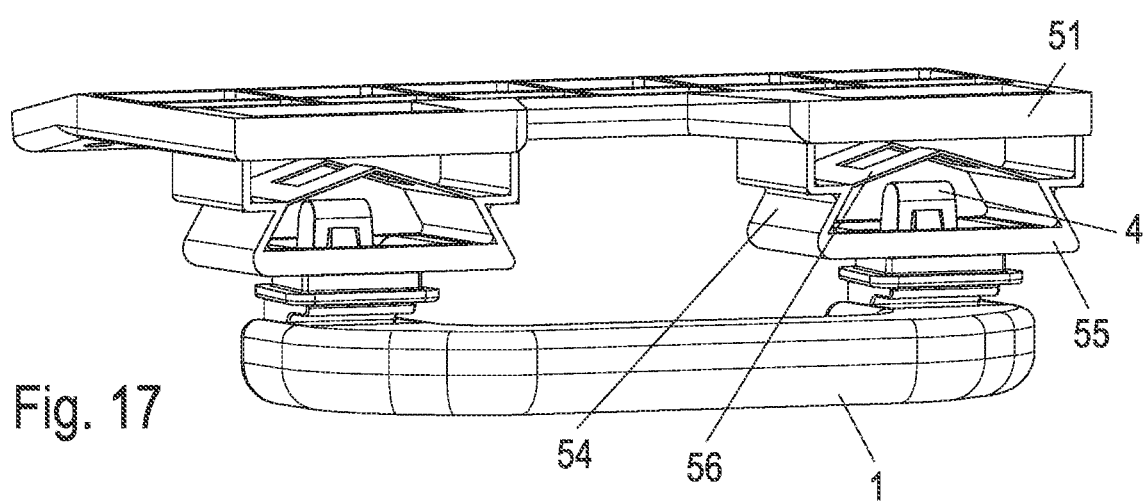
FIG. 17 is a view of the roof handle of FIG. 15 after an impact.

FIGS. 15 to 17 show a further embodiment of a roof handle A handle body 1 is held on a carrier 50 which comprises a molded body 51 made of plastic material which has an integrally formed retaining structure 54 as impact protection. An insert 52 made of a metal sheet with an opening 53 is fixed, preferably injection molded or glued, to the retaining structure 54 at an opening on a web 55. The insert 52 is firmly attached to the retaining structure 54 and serves to fix the two bearing elements 3 via the fastening elements 4. The retaining structure 54 comprises a shaping that acts as impact protection. FIG. 16 shows the handle body 1 in a holding position in which a user holds on to the handle body 1 and loads it vertically downwards. In this position, a retaining web 56, which is located at a distance from web 55 for fixing the insert 52, is subjected to tensile stress. This tensile stress results from the fact that the web 55 is connected to the retaining web 56 via two inclined webs 57, whereby the inclined webs 57 converge to the retaining web 56. The inclined web 57 is part of a V-shaped section of the retaining structure 54, at the tip of which the retaining web 56 is formed, so that the retaining web 56 is subjected to tensile stress when the handle body 1 is loaded downwards.

If the handle body 1 is swung back to its original position by a spring and then subjected to an impact which presses the handle body 1 towards the carrier 50, the retaining structure causes the retaining web 56 to buckle when a trigger force is exceeded, as shown in FIG. 17. Via the inclined webs 57, a compressive force is exerted on the retaining web 56, which then buckles, for example also by means of a corresponding predetermined buckling pin, thus enabling the web 55 with the insert 52 to move towards the molded body 51. This allows the handle body 1 to be moved relative to the molded body 51 in order to absorb impact forces.

The above-described embodiments with the impact protection can also be combined with each other in any desired combination in order to brake the handle body 1 even more effectively in the event of an impact.

FIG. 18 shows the roof handle with the carrier 10 and an additional shield 65 in the mounted position. Carrier 10 of the roof handle is fixed to the body of a vehicle by means of two screws 63 and associated nuts 64, which comprise one or two plates 61 and 62 in the area. The ends of the screws 63 and the nuts 64 protrude from the carrier 10.

In addition to the roof handle, an airbag 60 is provided which is triggered in the event of a crash to protect the occupants. To prevent damage to the airbag 60 when it is triggered, the shield 65 is designed as a cover that covers the fasteners on the carrier 10, such as the end of screw 63 and nut 64. Of course, other fasteners can also be used to fix the carrier 10, which are covered by the shield 65. The shield 65 is integral with the plastic molded body 11, but can also be made from the metal insert or by an additional component on the carrier. The shield 65 can also have a different geometry instead of a bow-shaped design, for example, plate-shaped or hood-shaped. In addition, the shield 65 can also be used with one of the other embodiments.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

The invention claimed is:

1. A roof handle for vehicles, comprising:
a carrier configured to be fixed to a vehicle roof, wherein the carrier includes a molded body made of plastic and at least one insert made of metal;
a handle body pivotably mounted to the carrier, wherein the handle body is pivotable between a holding position and a starting position and wherein the handle body is configured to receive a substantially downwardly directed weight force exerted on the handle body by a user in the holding position and configured to receive a return force from a spring to pivot the handle body back to the starting position, which is a folded-up position relative to the vehicle roof; and
at least one bearing element, wherein each bearing element is configured to hold the handle body to the at least one insert made of metal.

2. The roof handle of claim 1, wherein two inserts are provided on the molded body made of plastic at a distance from one another, and wherein two bearing elements are provided and each bearing element holds a corresponding insert.

3. The roof handle of claim 1, wherein each insert has at least one opening and wherein each of the at least one bearing elements includes a fastening element configured to be inserted in the at least one opening of a corresponding insert.

4. The roof handle according to claim 3, wherein the fastening element is locked to the opening of the metal insert.

5. The roof handle of claim 1, wherein the at least one insert made of metal is injection-molded into the molded body.

6. The roof handle of claim 1, wherein the molded body is formed substantially in the shape of a plate with a stiffening structure formed by webs (15).

7. The roof handle of claim 1, wherein the volume of the at least one insert is less than 40% of the total volume of the carrier.

8. The roof handle of claim 1, wherein the at least one insert is made of a metal sheet having a thickness between 0.5 mm and 3 mm.

9. The roof handle of claim 1, wherein an impact protection is provided on the carrier, in which the handle body can be moved towards the carrier by an impact on the handle body.

10. The roof handle according to claim 9, wherein the handle body remains dimensionally stable on the carrier when a triggering force is directed downwards in the holding position and the triggering force for the impact protection in the initial position moves the handle body upwards towards the carrier.

11. The roof handle of claim 1, wherein the handle body is of bow-shaped design and is held pivotably on the carrier via two bearing elements.

12. The roof handle of claim 1, wherein the at least one insert is made of metal by a bent and punched metal sheet.

13. The roof handle of claim 1, wherein a shield is provided on the carrier, which forms a cover for an adjacent airbag in the event of deployment.

14. The roof handle of claim 7, wherein the volume of the at least one insert is less than 20% of the total volume of the carrier.

15. The roof handle of claim 8, wherein the at least one insert is made of a metal sheet having a thickness between 1 mm and 2 mm.

16. A roof handle for a vehicle, comprising:
a carrier configured to be mounted to a roof of the vehicle, the carrier including:
a molded body made of plastic,
a first metal insert provided on the molded body, and
a second metal insert provided on the molded body;
a handle body pivotably mounted to the carrier, wherein the handle body is pivotable between a holding position and a starting position;
a first bearing element configured to mount to the first metal insert and to the handle body; and
a second bearing element configured to mount to the second metal insert and to the handle, wherein the first and second bearing elements are configured to hold handle body to the first and second metal inserts.

17. The roof handle of claim 16, wherein:
the carrier includes a first opening and a second opening;
the first metal insert includes a third opening;
the second metal insert includes a fourth opening;
the third opening is configured to align with the first opening and the first bearing element is inserted through the third and first openings to hold the handle body to the first metal insert; and
the fourth opening is configured to align with the second opening and the second bearing element is inserted through the fourth and second openings to hold the handle body to the second metal insert.

18. The roof handle of claim 17 wherein:
the first bearing element include a first latching web, configured to positively retain the first bearing element to the first metal insert after inserting the first bearing element though the third and first openings, and
the second bearing element include a second latching web, configured to positively retain the second bearing element to the second metal insert after inserting the second bearing element though the fourth and second openings.

19. The roof handle of claim 16 further comprising at least one impact protection device mounted on the carrier, wherein the impact protection device is configured to allow the handle body to move toward the carrier when an impact force is applied to the vehicle.

20. The roof handle of claim 19 wherein the first metal insert is a first impact protection device and the second metal insert is a second impact protection device.

* * * * *